July 23, 1935.  E. G. CARROLL  2,009,104
BRAKE
Filed March 31, 1932
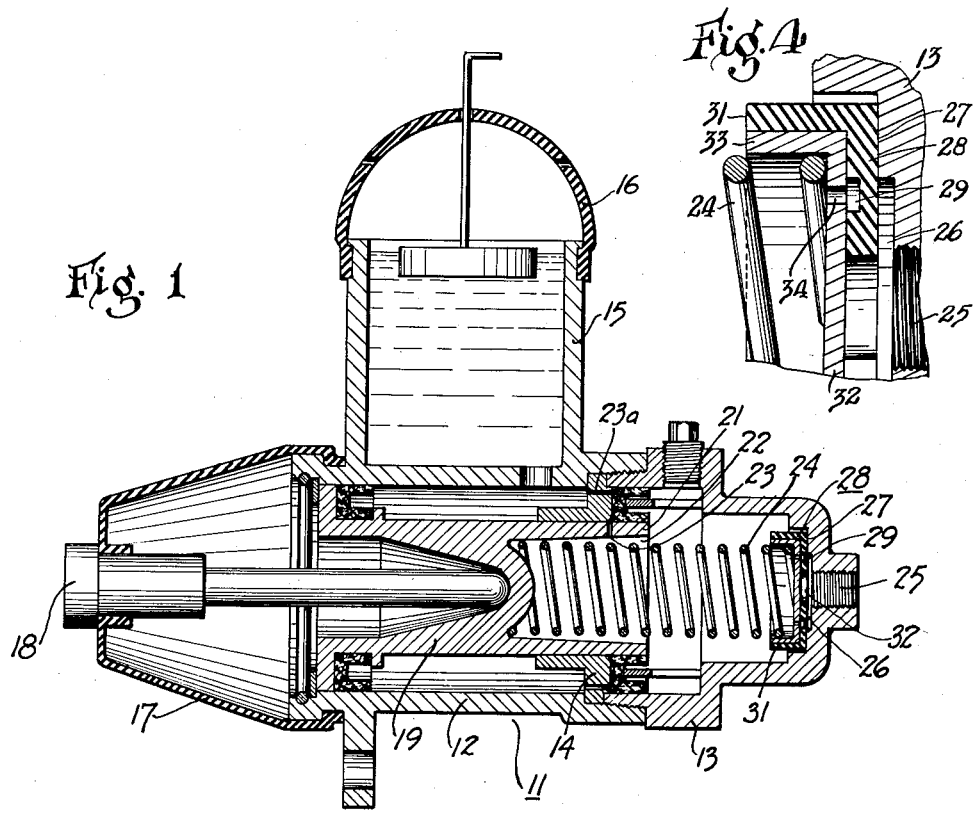
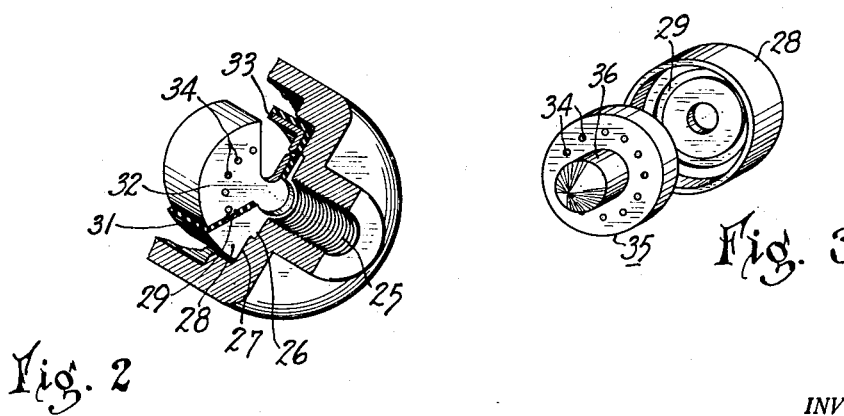
INVENTOR.
Eugene G. Carroll
BY Jerome R. Cox
ATTORNEY.

Patented July 23, 1935

2,009,104

UNITED STATES PATENT OFFICE 2,009,104

BRAKE

Eugene G. Carroll, South Bend, Ind., assignor to Bendix Aviation Corporation, South Bend, Ind., a corporation of Delaware Application March 31, 1932, Serial No. 602,328

4 Claims. (Cl. 60—54.6)

My invention relates to brakes and more particularly to hydraulic brakes.

One of the objects of my invention is to provide a simple inexpensive valve capable of varied uses but especially adapted for use in hydraulic brake systems.

A further object of the invention is to so arrange the valve in combination with a brake cylinder and a plunger therein that the valve and a spring acting thereon will function most efficiently to allow free flow of liquid from the cylinder to the brakes and will also maintain the liquid in the lines ahead of the valve under pressures predetermined by the position of the plunger in the cylinder.

A feature of the invention is the use of an annular rubber packing cup which combines with only two other elements—a spring and a metallic disk to form the complete two way valve, the rubber cup serving adjacent to its center to prevent the passage of liquid back into the cylinder while allowing it to pass freely out from the cylinder and serving adjacent to its periphery to prevent the passage of liquid out of the cylinder while allowing its passage into the cylinder whenever the liquid in the system ahead of the valve reaches predetermined pressures regulated by the position of the plunger within the cylinder.

Other objects and features of the invention will be apparent after a consideration of the subjoined specification and claims and after a consideration of the accompanying drawing in which:

Figure 1 is a sectional view of a master cylinder;

Figure 2 is a perspective view of the valve of Figure 1 shown on an enlarged scale and with sections cut away;

Figure 3 is a view in perspective of two elements of a modified form of valve; and Figure 4 is a view in section of the valve 28 taken substantially on the line 4—4 thereof.

Referring in detail to the drawing, there is shown in Figure 1, a master cylinder 11 formed of castings 12 and 13 and provided with a fixed annular head 14 secured between the castings. The casting 12 has formed integral therewith a reservoir 15, the upper end of which is closed by a rubber cap 16. The rear end of the cylinder 11 is substantially closed by a rubber boot 17. Through the center of the boot 17 and secured thereto is a piston rod 18 having its forward end contacting with a plunger 19 which is formed with a rear piston head 20 and a forward projection 21 which forms the brake applying piston.

The projection 21 is recessed as at 22 for receiving the rear end of a plunger return spring 24, the spring also serving as a valve controlling spring. The plunger 19 is formed with a relief port 23 communicating by suitable grooves with cooperating ports in the head 14 such as the port 23a.

The forward end of the casting 13 is formed with a threaded opening 25 concentric with the cylinder 11 and with the plunger 19. Surrounding the opening is a concentric valve seat 27 provided with a concentric recess 26. Seated on the seat 27 is an annular rubber cup 28 formed with a concentric annular groove 29 and with a peripheral inwardly extending flange 31. Positioned in the cup 28 is a metal disk 32 formed as a cup and having a peripheral flange 33 telescoping in the cup 28. The disk 32 is formed with a series of apertures 34 which register with the groove 29 and also with the recess 26. The spring 24 seats at its forward end within the flange 33 which thus forms a guide for said forward end of the spring.

The cup formed by the disk 32 is substantially equal in diameter to the recess formed in the plunger 19 so that the two combine to form an efficient enclosure for the spring 24. Moreover, it is to be noted that as the plunger moves forward and the spring is placed under greater compression, the enclosure surrounds the spring more completely and minimizes the danger of the spring buckling.

In Figure 3 is shown a slightly modified form of valve, parts corresponding to parts of the valve being designated by similar numerals. The disk 35 of said valve is formed with a central projection 36 which serves as a guide for the spring 24.

In operation forward movement of the plunger 19 removes the ports 23 from registry with the head 14 and liquid trapped ahead of the plunger is forced through the apertures 34 into the groove 29 and bending the inner edge of the cup 28, passes freely through outlet 25 to the brakes. When the pedal is released, pressure on the fluid at the brakes forces fluid against the cup 28 and compressing the spring 24 lifts the cup 28 from its seat and allows fluid to flow around the outside of the cup back into the master cylinder. As soon as the pressure ahead of the valve drops to the value determined by the spring 24, the cup is forced back onto the seat and the fluid ahead of the valve is maintained under the predetermined pressure.

It may thus be seen that I have provided a simple two way valve formed of a very small number of parts which due to its shape combines with the plunger in guiding the plunger return spring. I have provided a valve formed of a single rubber packing, and a single metal guide and have utilized the plunger return spring for urging the valve toward its seat. I have thus provided a very inexpensive construction capable of efficient action.

It is to be understood that the above described embodiments of my invention are for the purposes of illustration only and various changes may be made therein without departing from the spirit and scope of the invention.

I claim:

1. In a hydraulic brake system, a master cylinder having an outlet, a plunger in said cylinder, a valve associated with said outlet and comprising an annular rubber cup and an apertured disk bearing on the inside of said cup and spaced from the walls of said master cylinder by said cup, and a spring bearing at one end on said plunger and at the other end upon said disk.

2. In a hydraulic brake system, a cylinder formed with a tapped opening at its forward end and an enlarged valve seat surrounding said opening, a fixed annular head positioned in said cylinder, a plunger mounted to slide through said head for forcing liquid from said cylinder, an annular rubber cup seated on said valve seat and having a circumferential flange extending inward of said cylinder, a metallic apertured disk positioned within said cup and spaced from the walls of said cylinder by said cup and having a spring guide formed thereon, and a spring bearing at one end upon said disk and at the other end upon said plunger, whereby the escape of liquid back into said cylinder around the outside of said valve is governed by the position of said plunger.

3. A valve comprising a flexible cup formed with a circular groove on the inside thereof, and a disk associated with said cup and having apertures registering with said groove.

4. In a hydraulic brake system a master cylinder having an outlet, a plunger in said cylinder, a valve associated with said outlet and comprising a flexible cup formed with a circular groove on the inside thereof, a disk associated with said cup and having apertures registering with said groove, and a spring bearing at one end on said plunger and at the other end on said disk.

EUGENE G. CARROLL.